United States Patent Office 3,629,276
Patented Dec. 21, 1971

3,629,276
2-AMINO-5-SPIRO-SUBSTITUTED-OXAZO COMPOUNDS
Michael Raymond Harnden, Waukegan, Ill., assignor to Abbott Laboratories, North Chicago, Ill.
No Drawing. Filed July 16, 1969, Ser. No. 842,365
Int. Cl. C07d 85/26
U.S. Cl. 260—307                        2 Claims

ABSTRACT OF THE DISCLOSURE

Novel 2-amino-5-spiro-substituted-2-oxazolines (I) and 2-imino-5-spiro-substituted-2-oxazolines (II) of the formulae

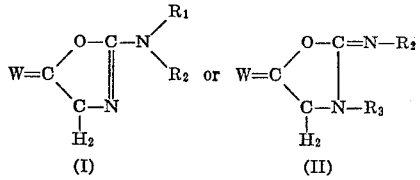

wherein $R_1$ and $R_2$ are hydrogen, loweralkyl, phenyl or phenyl-loweralkyl; $R_3$ is loweralkyl; and W is a cyclic moiety selected from the group consisting of cycloalkyl, loweralkyl-substituted cycloalkyl, loweralkyl-polysubstituted cycloalkyl wherein said cycloalkyl group has 4 to 8 carbon atoms, piperidinyl, loweralkyl-substituted piperidinyl, decalyl and norbornyl. The compounds are useful as anti-depressant agents.

---

The compounds of this invention include 2-amino-5-spiro-substituted compounds of the formula

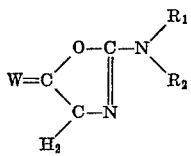

and 2-imino compounds of the formula

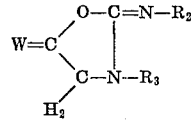

wherein $R_1$ and $R_2$ are hydrogen, loweralkyl, phenyl or phenyl-loweralkyl; $R_3$ is loweralkyl; W is a cyclic moiety selected from the group consisting of cycloalkyl, loweralkyl-substituted cycloalkyl, loweralkyl-polysubstitued cycloalkyl wherein said cycloalkyl group has 4 to 8 carbon atoms; piperidinyl, loweralkyl-substituted piperidinyl, decalyl and norbornyl. The loweralkyl groups have 1 to 4 carbon atoms.

The compounds have a molecular weight from about 140 to about 420 and preferably from about 140 to about 250. The compounds show biological activity and may be employed as the free base or as a pharmaceutically acceptable salt. The carbocyclic compounds in general possess antibacterial properties, this activity being especially pronounced when $R_2$ is phenyl. Those 2-amino-5-spiro-carbocyclic substituted-2-oxazoline compounds having a molecular weight from about 166 to about 168.5 are central nervous system stimulants. The heterocyclic substituted compounds are anti-depressants.

The anti-depressant activity is determined according to "The DOPA Response Potentiation Test" of G. M. Everett (Everett, G. M., Will, F., and Evans, A.; Fed. Proc. 23, 198 (1964). The stimulant activity is determined by administering the compound orally or intraperitoneally to mice at a dose from about 0.1 to about 100 mg./kg. of body weight and observing their increased activity, increased irritability, fur ruffling and like symptoms. The compounds, and their pharmaceutically acceptable salts, when water soluble, are administered in water solution or saline; the insoluble compounds are administered in an aqueous gum tragacanth suspension or in safflower oil. The antibacterial tests are performed in vitro by the agar dilution technique against a variety of organisms as described below.

The compounds of this invention may be prepared from the 2-hydroxy ethylamines which are generally available or which may be synthesized by hydrogenation of the appropriate cyanohydrin (Poos et al., J. Med. Chem., 6, 266 (1963). The substituted hydroxy ethylamine is reacted with cold cyanogen bromide to give the substituted 2-amino-2-oxazoline which step may be represented by the equation

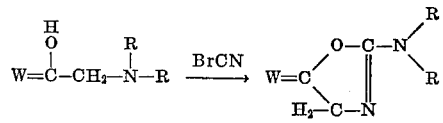

The structure of the products thus obtained is best represented by the above formula. Alkylation of the 2-amino-2-oxazolines with an alkyl halide in an alkaline medium produces 2-imino-oxazolidines of the formula

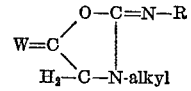

The invention will be better understood from the following examples which are intended to be illustrative only and not limiting.

EXAMPLE 1

Preparation of the starting material

Cyclopentyl cyanohydrin (0.1 mole) is dissolved in glacial acetic acid (400 ml.) containing $PtO_2$ (2 g.) in suspension and hydrogenated at 20° C. and 2.8 kg./cm. pressure. The uptake of hydrogen is complete in one hour. The catalyst is removed by filtration and the filtrate concentrated under reduced pressure to a viscous syrup. Upon trituration of the syrup with diethyl ether (200 ml.), white crystals of the 1-aminomethyl cyclopentanol acetate are deposited. Salts are recrystallized from a mixture of isopropyl alcohol and diethyl ether. Other representative starting materials which are made according to the same procedure are set forth in Table I.

TABLE I

| Compound: | Melting point, ° C. |
|---|---|
| 1-aminomethylcyclohexanol acetate | 122–124 |
| 1-aminomethylcycloheptanol acetate | 93–95 |
| 1-aminomethyl-4-methylcyclohexanol acetate | 109–111 |
| 1-aminomethyl-3-methylcyclohexanol acetate | 126–135 |
| 1-aminomethyl-3,5-dimethylcyclohexanol acetate | 152–155 |
| 1-aminomethyl-3,3,5-trimethylcyclohexanol acetate | 148–150 |
| 1-aminomethyl-3,4,5-trimethylcyclohexanol acetate | 154–156 |
| 1-aminomethyl-3,3,5,5-tetramethylcyclohexanol acetate | 143–144 |
| 2-aminomethyl-2-norbornanol acetate | 92–119 |
| 2-aminomethyl-2-decalol acetate | 124–144 |

EXAMPLE 2

Preparation of 2-amino-5-spiro-cyclopentyl-2-oxazoline

A quantity of 1-aminomethylcyclopentanol acetate (0.1 mole) prepared according to Example 1 and anhydrous sodium acetate (8.2 g., 0.1 mole) are dissolved in methanol (150 ml.) and a solution of sodium methylate (5.4 g., 0.1 mole) in methanol (100 ml.) is added. The solution is cooled to 0° C. and a solution of cyanogen bromide (10.6 g., 0.1 mole) in methanol (30 ml.) is added over a period of 15 minutes. The solution is stirred at 0° C. for one hour. The solvent is evaporated under reduced pressure and the residue dissolved in minimum volume of water necessary to obtain solution. A concentrated solution of potassium carbonate is added and a white solid precipitates. The solid is collected, dried and recrystallized from a mixture of cyclohexane and normal hexane to give the pure product melting at 154 to 156° C. Representative compounds which are prepared by the procedures of Example 2 are listed in Table II.

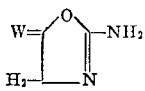

TABLE II
2-AMINO-5-SPIRO-SUBSTITUTED-2-OXAZOLINES

| Example: | W | M.P., °C. | M.W |
|---|---|---|---|
| 2a | [cyclopentyl] | 154–156 | 140.19 |
| 2b | [cyclohexyl] | 126–128 | 154.21 |
| 2c | [cycloheptyl] | 132–134 | 168.24 |
| 2d | Same as above | 136–138 | 182.27 |
| 2e | CH₃–[cyclohexyl] | 147–162 | 168.24 |
| 2f | Same as above | 107–108 | 168-24 |
| 2g | [cyclohexyl with two CH₃] | 147–149 | 182.27 |
| 2h | [cyclohexyl with CH₃, CH₃, CH₃] | 154–156 | 196.29 |
| 2i | CH₃–[cyclohexyl]–CH₃ with CH₃ | 178–180 | 196.29 |
| 2j | [cyclohexyl with CH₃ CH₃ / CH₃ CH₃] | 142–143 | 210.32 |
| 2k | [bicyclic] | 159–161 | 166.22 |
| 2l | [decalin-type] | 154–161 | 208.31 |
| 2m | CH₃–N–[cyclohexyl] | 185–186 | 169.23 |

EXAMPLE 3A

Preparation of a 2-imino-5-spiro-oxazolidine

To a solution of 2-amino-5-spiro-cyclohexyl-2-oxazoline (Example 2b) (5.0 g., 0.032 mole) in methanol (100 ml.) is added $K_2CO_3$ (13.8 g.) and $CH_3I$ (6.3 ml., 0.096 mole). The mixture is heated under reflux for 5 hours. The solution is concentrated under reduced pressure and the residue extracted with n-$C_6H_{14}$ (250 ml.). The solution is filtered, dried and concentrated under reduced pressure to a viscous oil (6.0 g.). The oil is dissolved in methanol (25 ml.) and fumaric acid (3.4 g.) added. Diethyl ether is then added to the clear solution until crystallization commences. The crystals are filtered and recrystallized from a methanol-diethyl ether mixture two more times to give the pure fumarate salt of 2-imino-3-methyl-5-spiro-cyclohexyl-oxazolidine, M.P. 171–172°. The fumarate (1.0 g.) is dissolved in methanol (20 ml.) and a solution of $NaOCH_3$ (0.4 g.) in methanol (10 ml.) added. The mixture is stirred at 20° for 15 minutes and then filtered. The filtrate is concentrated under reduced pressure to an oil. The oil is dissolved in n-$C_6H_{14}$ (50 ml.) and the solution filtered and concentrated under reduced pressure to give 2-imino-3-methyl-5-spiro-cyclohexyl-oxazolidine as the free base.

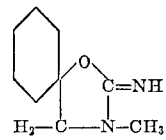

The compounds of this example and of Example 3B are central nervous system depressants.

EXAMPLE 3B

Isolation of 2-methylimino-3-methyl-5-spiro-cyclohexyl-oxazolidine

The original mother liquors from which the fumarate of Example 3A crystallized are concentrated under reduced pressure. The oil claimed is dissolved in methanol and diethyl ether added until crystallization commences. The mixture is kept at 5° for 2 hours, filtered, and the filtrate concentrated under reduced pressure. This process is repeated a further two times and the oil obtained crystallizes upon standing. After recrystallization from methanol (20 ml.) by addition of diethyl ether (200 ml.) there is obtained the pure fumarate salt of 2-methylimino-3-methyl-5-spiro-cyclohexyl-oxazolidine, M.P. 149–151°. The free base

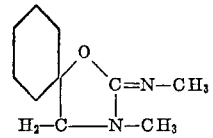

is liberated in the same manner as described in Example 3A.

EXAMPLE 4

Preparation of 2-methylamino-5-spiro-cyclohexyl-2-oxazoline

A solution of methyl isocyanate (8.55 g., 0.15 mole) in $CH_2Cl_2$ (15 ml.) is added to a solution of 1-aminomethylcyclohexanol (19.4 g., 0.15 mole) in $CH_2Cl_2$ (85 ml.) at 0° C. The mixture is stirred for 2 hours and the white precipitate which is attained is filtered and dried to give 1-(2-hydroxy-2-spirocyclohexyl)ethyl-3-methylurea

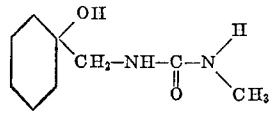

M.P. 136–137°, 91.0% yield.

To a vigorously stirred suspension of this compound (18.6 g., 0.1 mole) in CH$_2$Cl$_2$ (400 ml.) at 0° is added a solution of SOCl$_2$ (11.9 g., 0.1 mole) in CH$_2$Cl$_2$ (40 ml.). The clear solution obtained is heated at reflux temperature for 30 minutes and then concentrated under reduced pressure. The residue is triturated with boiling H$_2$O (250 ml.) and the aqueous solution separated from an oil which crystallized upon standing. Recrystallization from cyclohexane afforded 1-(cyclohex-1-enyl) methyl - 3 - methylurea, M.P. 91–93°,

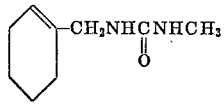

The aqueous solution is basified with a saturated solution of K$_2$CO$_3$ and the resulting white precipitate is filtered, dried, and recrystallized twice from n-C$_6$H$_{14}$ to give 2-methylamino-5-spirocyclohexyl-2-oxazoline

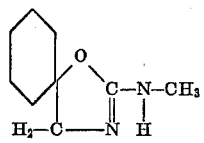

M.P. 97–99°. This compound (M.W. 168.24) exhibits stimulant activity when tested for pharmacological properties.

EXAMPLE 5

Preparation of 2 - dimethylamino - 5 - spirocyclohexyl-2-oxazoline

Dimethylcarbamyl chloride (21.5 g., 0.2 mole) is added to a solution of 1-aminomethylcyclohexanol (25.9 g., 0.2 mole) and triethylamine (30.3 g., 0.3 mole) in dry toluene (400 ml.) at 0°. A precipitate forms immediately. The mixture is stirred at 20° C. for 2 hours and filtered. The solid obtained is extracted with hot diethyl ether (3 portions of 500 ml.). The diethyl ether solutions are dried (MgSO$_4$) and concentrated to yield 1-(2-hydroxy - 2 - spirocyclohexyl)-ethyl - 3,3 - dimethylurea, M.P. 96–97°,

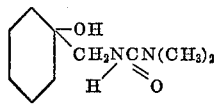

The hydroxyurea (20.0 g., 0.1 mole) is treated with SOCl$_2$ and then with boiling H$_2$O, as described above for the synthesis of Example 4 but no H$_2$O insoluble fraction is obtained. The aqueous solution is basified with a saturated solution of K$_2$CO$_3$ and extracted with CH$_2$Cl$_2$ (3 portions of 250 ml.). The CH$_2$Cl$_2$ solution is dried and concentrated under reduced pressure to an oil. The oil is distilled to yield 2-dimethylamino-5-spiro-cyclohexyl-2-oxazoline, B.P. 73–75° (0.85 mm.),

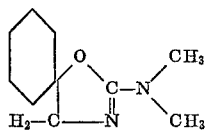

EXAMPLE 6A

Preparation of 2 - phenylamino - 5 - spiro-cyclohexyl-2-oxazoline

A solution of phenyl isocyanate (17.9 g., 0.15 mole) in CH$_2$Cl$_2$ (25 g.) is added to a solution of 1-aminomethylcyclohexanol (19.4 g., 0.15 mole) in CH$_2$Cl$_2$ (85 ml.) at 0° C. The mixture is stirred for two hours and the white precipitate which is obtained is filtered and dried to give 1-(2-hydroxy-2-spirocyclohexyl) ethyl-3-phenylurea,

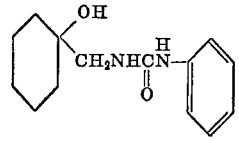

M.P. 166–168° C., yield 92.4%.

To a vigorously stirred suspension of this compound, (18.2 g., 0.1 mole) in CH$_2$Cl$_2$ (400 ml.) at 0° C. is added a solution of SOCl$_2$ (11.9 g., 0.1 mole) in CH$_2$Cl$_2$ (40 ml.). The clear solution obtained is heated at reflux temperature for 30 minutes and then concentrated under reduced pressure. The residue is triturated with boiling H$_2$O (250 ml.) and the aqueous solution separated from an oil which crystallized upon standing. The aqueous solution is basified with a saturated solution of K$_2$CO$_3$ and the resulting white precipitate is filtered, dried and recrystallized twice from n-C$_6$H$_{14}$ to give 2-phenylamino-5-spiro-cyclohexyl-2-oxazoline,

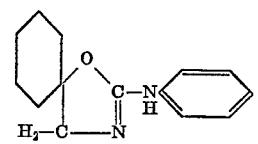

M.P. 142–143° C.

EXAMPLE 6B

Preparation of 2 - phenylamino - 5 - spiro[2'-methylcyclohexyl]-2-oxazoline

By a method similar to that of Example 6A but utilizing 1-aminomethyl - 3 - methylcyclohexanol (20.8 g., 0.15 mole), there is produced 2 - phenylamino - 5 - spiro[2'-methylcyclohexyl]-2-oxazoline, M.P. 129–144° C.

The compounds prepared as described above were tested against several bacterial organisms in vitro and were found to inhibit growth at a concentration of 1000 parts per million. The data are summarized in Table III

TABLE III

| Compound of Example— | Staphylococcus aureus | Pseudomonas aeruginosa | Proteus vulgaris |
|---|---|---|---|
| 2a | X | X | |
| 2b | X | X | |
| 2c | X | X | X |
| 2d | X | X | X |
| 2e | X | | |
| 2f | X | X | X |
| 2g | X | X | X |
| 2h | X | X | X |
| 2i | X | X | X |
| 2j | X | X | X |
| 2k | | X | |
| 2l | X | X | X |
| 4 | | X | |
| 6A | X | | |
| 6B | X | | |

I claim:
1. A spiro compound selected from the group consisting of 2-amino compounds of the formula

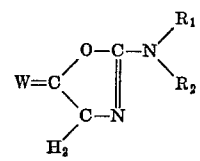

and 2-imino compounds of the formula

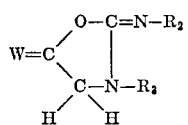

wherein $R_1$ and $R_2$ are selected from the group consisting of hydrogen, lower alkyl, phenyl and phenloweralkyl; $R_3$ is lower alkyl and W is selected from the group consisting of piperidinyl, loweralkyl-substituted piperidinyl, decalyl and norbornyl, said lower alkyl group having 1 to 4 carbon atoms; and the pharmaceutically acceptable salts thereof.

2. A 2-amino-2-oxazoline compound according to claim 1 wherein $R_1$ and $R_2$ are each hydrogen and W is 2'-norbornyl.

References Cited

Hojo: C. A. 69, 107065b (1968).

ALEX MAZEL, Primary Examiner

R. V. RUSH, Assistant Examiner

U.S. Cl. X.R.

260—294.7 D; 424—267, 272